US006851441B2

(12) United States Patent
Wilson

(10) Patent No.: US 6,851,441 B2
(45) Date of Patent: Feb. 8, 2005

(54) APPARATUS FOR COLLECTING RAINWATER

(75) Inventor: Gregory Wilson, Kangaroo Point (AU)

(73) Assignee: Rainsystems PTY LTD, Brisbane (AU)

( * ) Notice: Subject to any disclaimer, the term of this patent is extended or adjusted under 35 U.S.C. 154(b) by 0 days.

(21) Appl. No.: 10/471,376

(22) PCT Filed: Mar. 8, 2002

(86) PCT No.: PCT/AU02/00266
§ 371 (c)(1),
(2), (4) Date: Sep. 9, 2003

(87) PCT Pub. No.: WO02/072965
PCT Pub. Date: Sep. 19, 2002

(65) Prior Publication Data
US 2004/0084093 A1 May 6, 2004

(30) Foreign Application Priority Data
Mar. 9, 2001 (AU) .............................. PR3614

(51) Int. Cl.$^7$ ................................ E03B 3/02
(52) U.S. Cl. ................... 137/1; 137/561 R; 137/312
(58) Field of Search ............... 137/1, 357, 312, 137/561 R; 52/DIG. 12

(56) References Cited

U.S. PATENT DOCUMENTS

| 5,010,657 | A |   | 4/1991 | Knapp |            |
|-----------|---|---|--------|-------|------------|
| 5,299,591 | A | * | 4/1994 | Duncan | 137/15.11 |
| 5,606,990 | A | * | 3/1997 | Clark | 137/259   |
| 5,806,202 | A |   | 9/1998 | Blackman et al. |    |
| 6,553,723 | B1 | * | 4/2003 | Alcorn | 52/15    |
| 6,612,079 | B2 | * | 9/2003 | DeGarie et al. | 52/63 |

FOREIGN PATENT DOCUMENTS

| AU | 55397/69 A    | 12/1970 |
| AU | 199965330 A1  | 1/2001  |
| DE | 2518674 A1    | 11/1976 |
| JP | 2000-142329 A | 5/2000  |
| JP | 2000-240109 A | 9/2000  |

* cited by examiner

Primary Examiner—Kevin Lee
(74) Attorney, Agent, or Firm—Sacco & Associates, PA

(57) ABSTRACT

Apparatus for collecting rainwater including a flexible water-support sheet of elongate rectangular form mounted in a housing and movable between a stored disposition within the housing and shielded thereby from unwanted matter, and an extended operative disposition in which a free end of the sheet extends through an opening in the housing and substantially longitudinally to a predetermined extent. The extended sheet is supported in the operative disposition such that the sheet is dished transversely in a trough-like form to receive and retain rainwater and is inclined upwardly in its longitudinal direction away from the housing for draining received water gravitationally back to the housing. A water control means is associated with the housing whereby water received from the water-support sheet is available for passage to storage or distribution means. A spool may be included about which the water-support sheet may be wound when retracted.

14 Claims, 5 Drawing Sheets

APPARATUS FOR COLLECTING RAINWATER

This invention relates to an improved method of and apparatus for collecting rainwater, and it has particular but not exclusive reference to improvements over the types of potable rainwater collectors disclosed in U.S. Pat. Nos. 1,647,900 and 5,606,990.

TECHNICAL FIELD OF THE INVENTION

1. Background Art

The aforementioned U.S. Pat. No. 5,606,990 discussed fully the background art and commercial factors which led to its development in 1993, and since then the increased consumption of drinking water has resulted in increased awareness of the need for high quality and purity. There is therefore a current need for more ways of meeting such demands, including further ways of collecting rainwater and ensuring that it will reach the public in a condition which makes it more than competitive with the large number of brands of "bottled water" now available.

The present invention has been devised with the above considerations in mind, and it accordingly has for its principal object to provide an improved method of and apparatus for collecting rainwater with greater ease, efficiency and economies of production than heretofore attained. A further object is to provide novel apparatus which will provide a useful alternative choice for those people who have come to accept the efficiency and other benefits derived from the apparatus of U.S. Pat. No. 5,606,990. Other specific objects and advantages of the invention will become apparent from the practical examples later described.

2. Disclosure of the Invention

With the foregoing and other objects in view, the present invention resides broadly, according to one aspect thereof, in a method of collecting rainwater including:

providing a flexible water-support sheet mounted movably for extension withdrawably from or retraction within a protective housing therefor;

extending said sheet away from the housing in the event of rain and supporting it in an extended operative attitude so that it is dished transversely thereof and is inclined longitudinally sufficient to cause rainwater which has impinged against it and collected thereon to drain gravitationally back towards the housing;

drawing off from the sheet at or near the housing the so-collected rainwater for storage or distribution, and retracting said sheet to non-operative attitude within the housing for its protection against settlement thereon of dust or other deleterious matter until its use for water collection is again required.

It is preferred that the aforesaid broad method includes the use of power-actuation means for extending and retracting the sheet, the latter being preferably coiled about an axis of rotation in the housing and having its free end arranged to be drawn out by cable means having a return run to cable-winding means at the housing, while retraction involves the reverse procedure with the coil being power-actuated from the housing, the cable passing around pulley means defining the outermost limit of sheet extension. Other method steps will be apparent from the descriptions herein of preferred forms of apparatus for carrying out the methods broadly defined above.

According to another aspect of the invention, broadly stated, there is provided apparatus for collecting rainwater including:

a flexible water-support sheet of elongate rectangular form mounted in a housing in such manner that it is movable between a stored non-operative disposition within the housing and shielded thereby from unwanted matter and an extended operative disposition in which a free end of the sheet extends through an opening in the housing and substantially longitudinally to a predetermined extent;

sheet-support means arranged to support the extended sheet in said operative disposition in such manner that the sheet is dished transversely to trough-like form to receive and retain rainwater and is inclined upwardly in its longitudinal direction away from the housing for draining received water gravitationally back to the housing, and water control means associated with the housing whereby water received from the extended operative water-support sheet is available for passage to storage or distribution means.

Preferably the means for supporting the extended sheet include a plurality of supporting assemblies in spaced relationship along the line of extension. Suitably, each supporting assembly includes a pair of fixed support posts fixedly mounted at their lower ends and interconnected at their upper ends by a downwardly-bowed support member adapted to bear under and transversely across the sheet. It is also preferred that the sheet be supported slidably on the support member in X transversely-dished manner by the provision of retaining and guiding clips or lugs so placed at the upper ends of the support posts as to be disposed above the sheet edges and thus retain the edges against vertical dislodgement while permitting sliding of the sheet for extension and retraction purposes.

The supporting assemblies also have affixed thereto and therebetween longitudinal supporting cables in laterally spaced parallel relationship to provide transverse dishing or bowing as well as support for the sheet to slide therealong.

It is preferred that pulling of the free end of the sheet be effected by a control cable passing over a pulley on a post at the outermost limit of withdrawal, the cable beneath the pulley being returned to a point near the housing, power-actuation of the cable for extension purposes or of the sheet for retraction purposes being effected by a suitable motor. However, manual actuation is possible in some embodiments of the invention. Other features of the apparatus involved in the invention will become apparent from the following description.

BRIEF DESCRIPTION OF THE DRAWINGS

In order that the invention may be more readily understood and put into practical effect, reference will now be made to the accompanying drawings, wherein.

Figure 1:
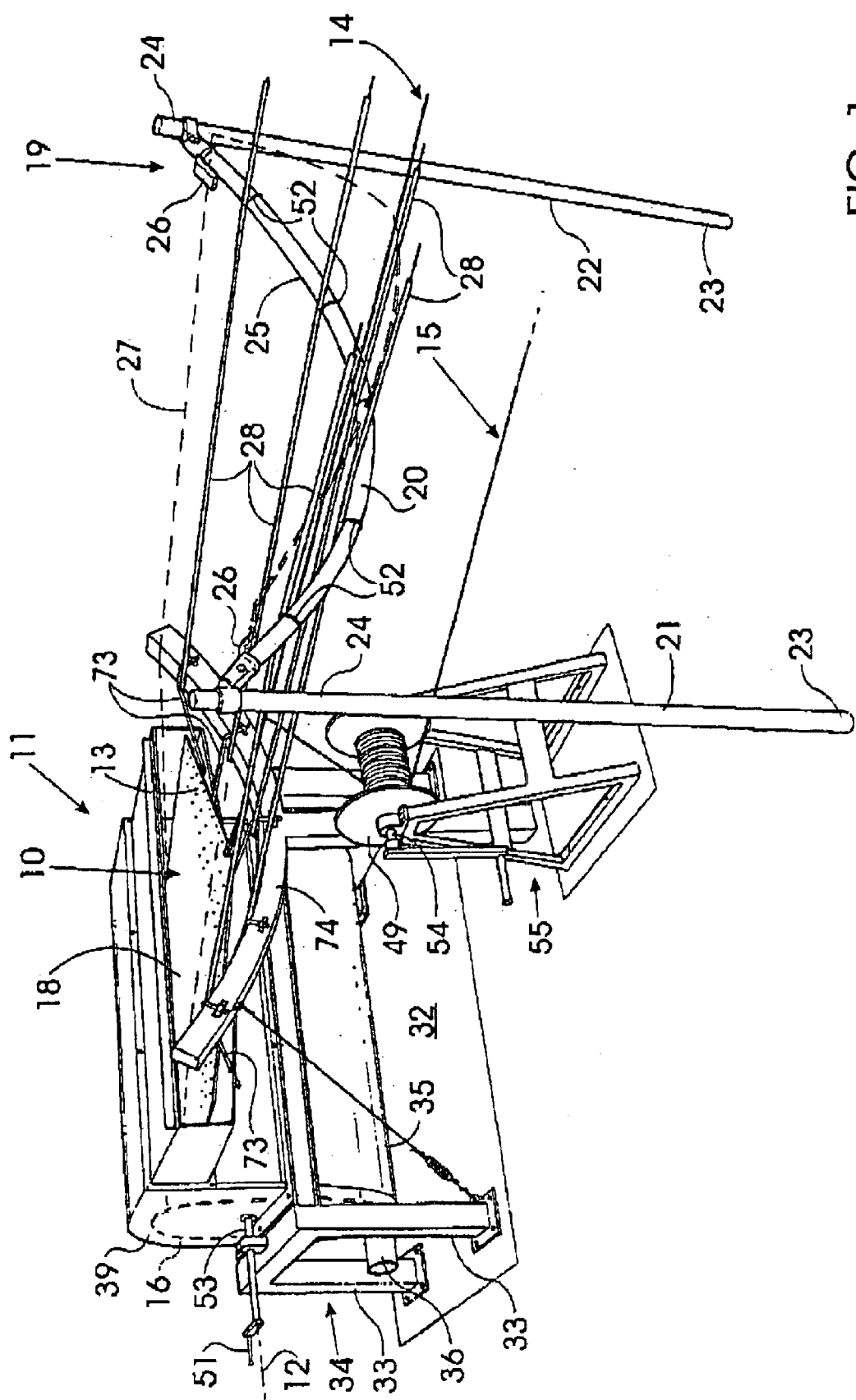
FIG. 1 is a perspective view of part of one form of rainwater collecting apparatus according to the invention, showing a single housing and water-support membrane or sheet, as well as one of a plurality of sheet-support assemblies, sheet movement being manually controlled in this embodiment.

The drawings illustrate the broad method according to the invention, for collecting rainwater including the provision of a flexible water-support sheet or membrane 10 mounted movably for extension withdrawably from or retraction within a protective housing 11. The method involves extending the sheet 10 away from the housing 11 in the event of rain and supporting it in extended operative attitude, as shown in all Figs. so that it is dished transversely and is inclined longitudinally to such extent that rainwater collected on the sheet 10 will drain gravitationally back towards the housing 11. The method involves drawing off from the sheet 10 at or near the housing 11 the collected rainwater for storage or distribution purposes. The sheet 10 can then be retracted to non-operative attitude within the housing 11 so that it will be protected against settlement thereon of dust or other deleterious matter until its use for water collection is again required.

The method may include the use of power-actuated means for extending and retracting the sheet 10, the latter being coiled on a spool about a horizontal axis of rotation 12 in the housing 11. The free end 13 of the sheet 10 can be drawn out by cable means indicated generally at 14 having a return run 15 extending back to a cable-winding spool 49 having a handle 50. Retraction of the sheet 10 involves the opposite procedure with the coil 16 (indicated by dotted lines) of sheet 10 being rotated by handle 51 at the housing in anti-clockwise direction when viewing FIG. 1. The cable 14 passes around a pulley 29 defining the outermost limit of extension of the sheet 10. Both procedures are manually effected in the embodiment of FIG. 1.

Figure 2:
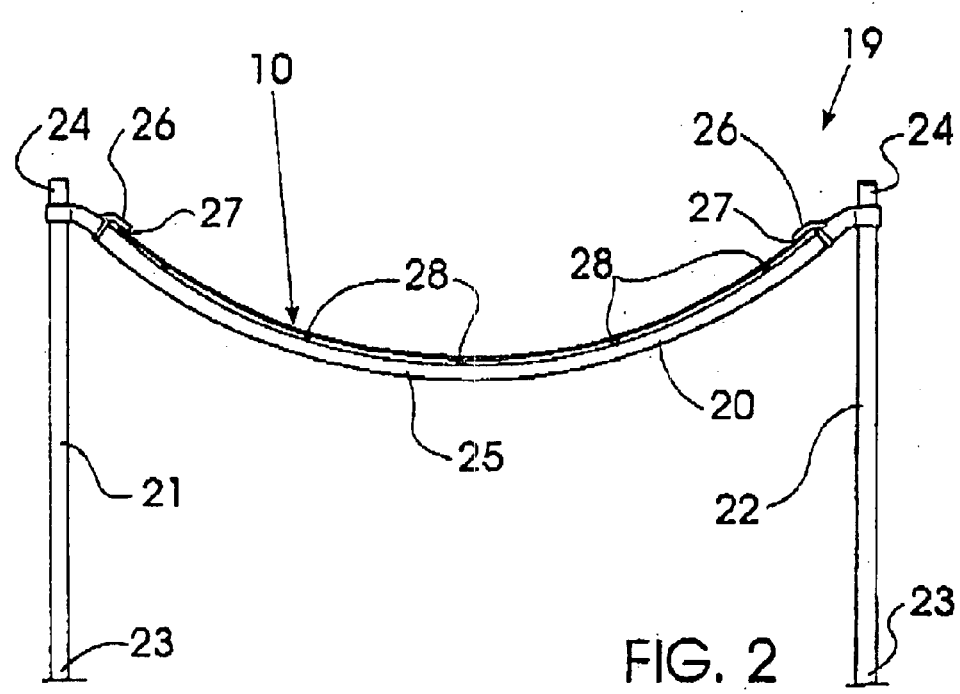
FIG. 2 illustrates a typical cross-section of the sheet held by a typical sheet-support assembly.
Figure 4:
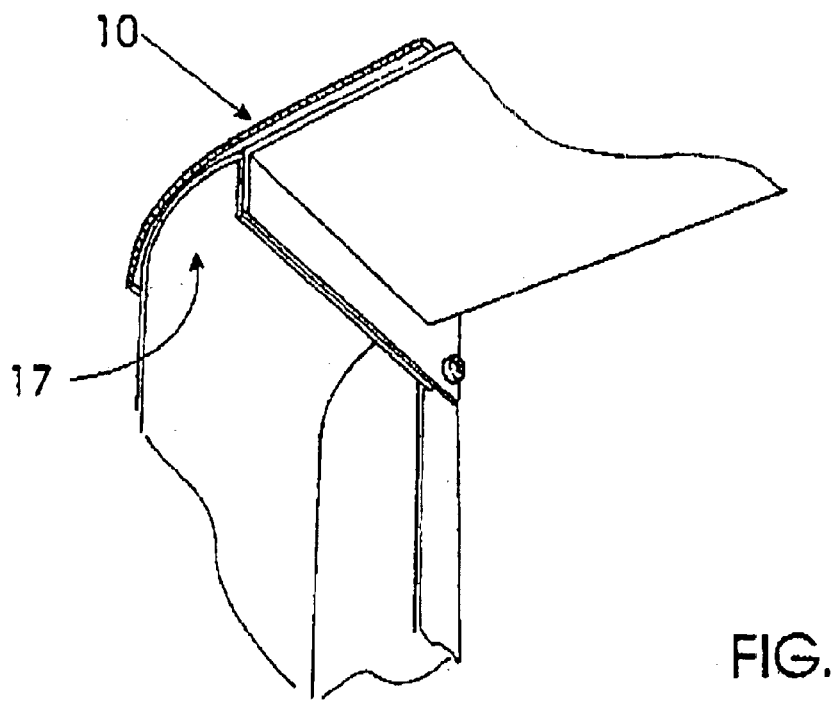
FIG. 4 is a detailed perspective view showing the curvature of the sheet at the opening into the housing.

As noted from FIG. 1 the housing 11 has an opening 18 through which the free, outer end 13 of the sheet 10 may be extended as the coil 16 is unwound, it being clear that the housing will exclude unwanted matter from the sheet 10 when it is in coil form within the housing. As apparent from FIGS. 1 and 2, supporting means indicated generally at 19 will be used to support the extended sheet and for maintaining it in dished and inclined attitude so that water will drain back from the entire surface of the sheet 10 to or towards the housing 11. A guide and restraining assembly 17, curved as illustrated in FIG. 4, to prevent friction wear, is provided to co-act with the sheet 10 where it meets the coil tangentially thereto.

The supporting means will be seen to include a plurality of supporting assemblies 20 in spaced relationship, along the line of extension, each supporting assembly 20 including a pair of fixed support posts 21, 22 fixedly mounted at their lower ends 23 and interconnected at their upper ends 24 by a downwardly-bowed support member 25 adapted to provide support under and transversely across the sheet 10. The latter will be held on cables 28 on the support members 25 in transversely-dished or bowed manner by the provision of clips or lugs 26 acting as retaining and guiding members, so placed at the upper ends 24 of the support posts as to be disposed above the respective sheet edges 27 and thus retain the edges against vertical dislodgement while permitting sliding of the sheet 10 for extension and retraction purposes.

The sheet or membrane 10 may take various forms but is preferably a coil of poly-ethylene food grade geomembrane say 2 mm thick by 2 m wide by 250 m long giving a collection area of 500 square meters when fully extended.

Figure 3:
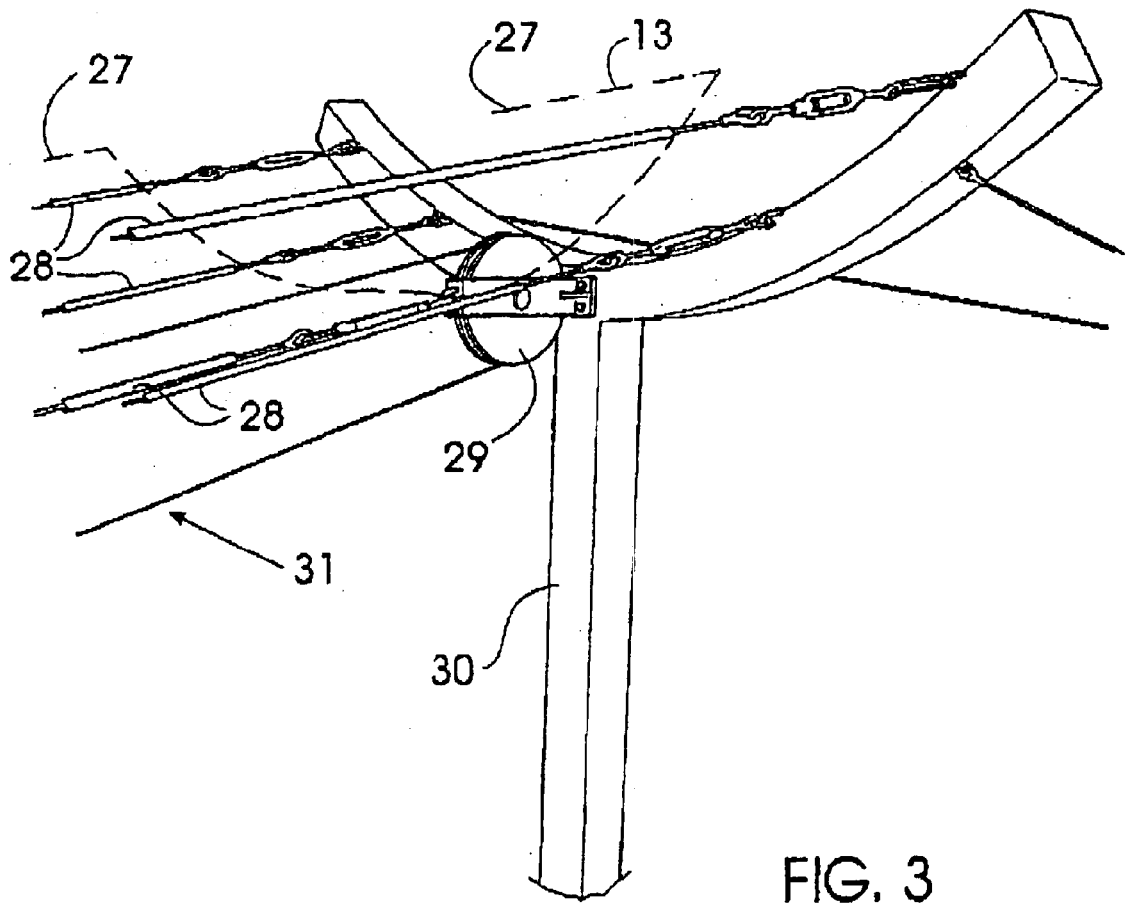
FIG. 3 shows in perspective view the rigid outer end post, together with the terminal pulley and the end connections of longitudinal sheet-supporting cables.

The sheet 10 slides on and along the longitudinal cables 28 along its length in laterally spaced parallel relationship. The cables are shown secured to the curved support member 25 by suitable ties or clips 52. The free end 13 of the sheet 10 is connect d to the cable 14 passing over a pulley 29 on a post 30 at the outermost limit of withdrawal as shown particularly in FIG. 3, the cable beneath the pulley having a return run 31 extending back to the cable-winding spool 49.

The housing 11 has other components shown in the drawings but which are variable as to design, such as a footplate 32 on which are bolted legs 33 of a supporting frame 34 for the housing 11. The latter in this case is cylindrical about the coil 16 but is extended at its bottom 35 where a rainwater outlet 36 is provided in the form of a threaded section of a bolt-on flange by way of example. At the housing opening 18 for the sheet 10, a fine mesh screen (not shown) could be secured to provide a screening and scraping function for removing foreign objects such as wind-blown grass, leaves or the like. The housing 11 suitably has a bolted-on section 39 which can be removed when necessary for the purpose of cleaning or maintenance, or for replacing the drum or roll of membrane if necessary.

Figure 5:
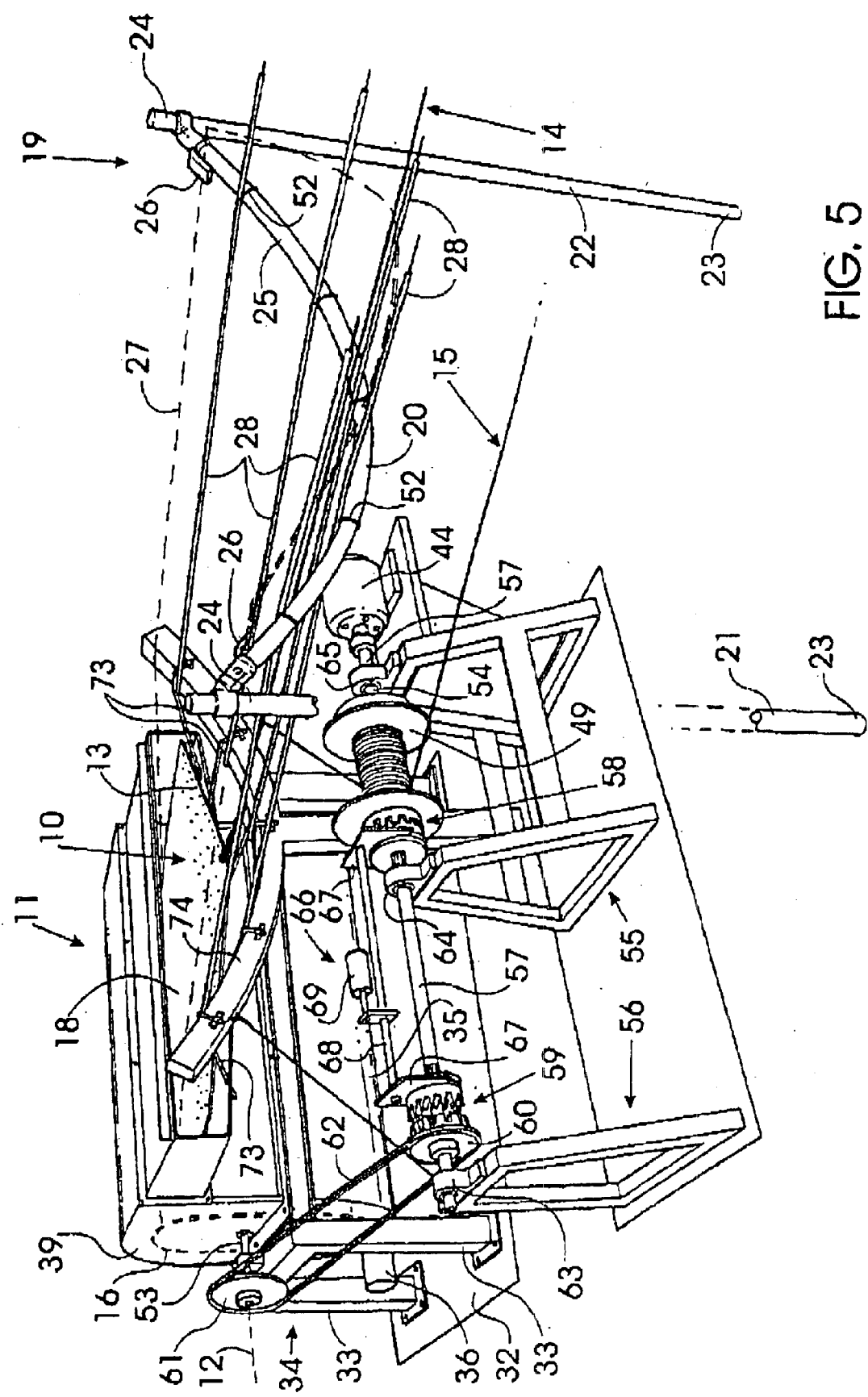

The embodiment of FIG. 5 is similar to that of FIG. 1 except for the provision of an hydraulic drive motor 44 (or electric motor if preferred) for selective operation by power-actuation of either the shaft 53 for the coil of sheet or the shaft 54 of the cable-winding spool 49. The mounting sub-frame 55 for the cable winder is extended to a further section 56 so that the main shaft 57 from the motor may rotate the spool 49 through one dog-clutch connection 58 or may rotate the coil shaft 53 through the alternate dog-clutch connection 59 via sprocket wheels 60, 61 and drive chain 62.

Figure 6:
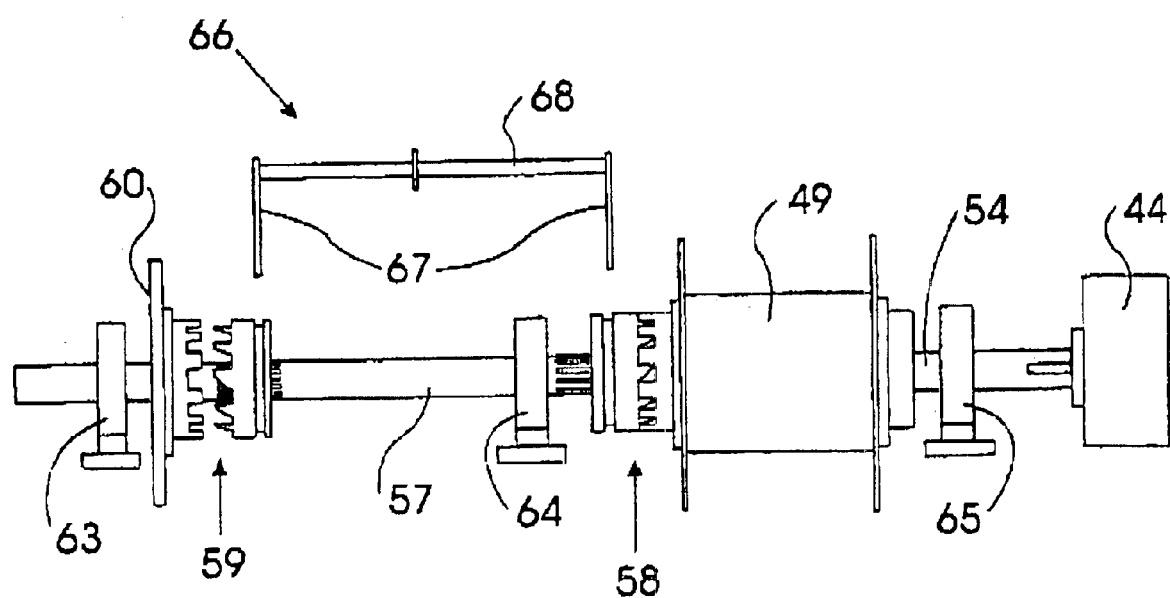
FIG. 6 is similar to FIG. 1, but showing a further embodiment of the invention in which power-actuation means are provided for extending or retracting the sheet.

FIG. 6 shows the pertinent components in which the shaft 57 is journalled in bearings 63, 64, 65 and the dog-clutch members are moved in unison by a slidable selector arm 66 having engagement yokes 67. Sliding of the arm 66 for selective engagement is effected by a slide rod 68 which is solenoid-actuated in a selector actuator 69.

Figure 7:
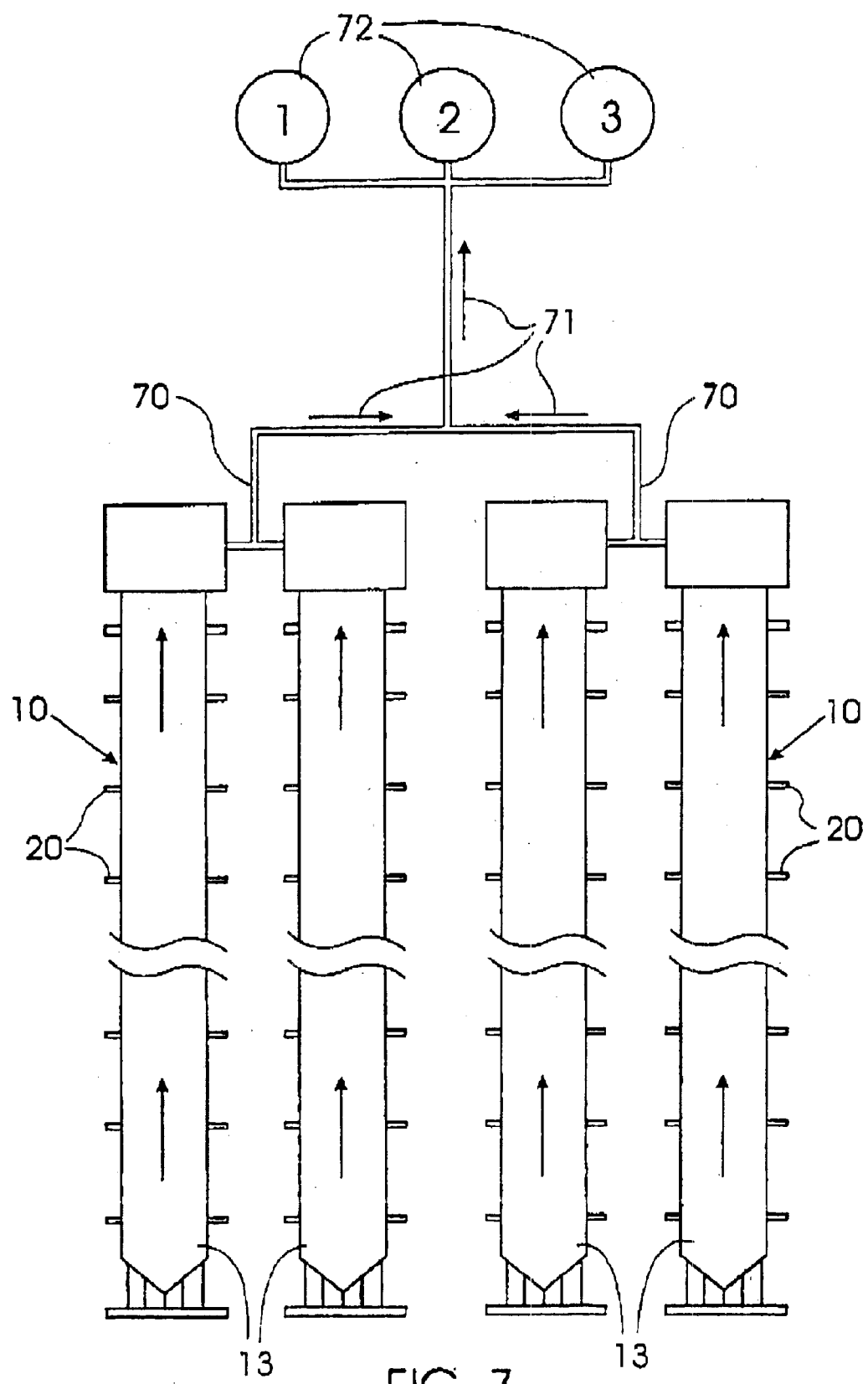
FIG. 7 is a diagrammatic plan view of a commercial assembly of four housings and water-support sheets, each with its plurality of spaced sheet-support assemblies, together with a manifold-pipe collection system and connection to storage tanks.

FIG. 7 shows a commercial installation of four assemblies with manifold pipes 70 to carry water from the housings 11 in the direction of arrows 71 to three storage tanks 72 from which the water can be distributed. The invention lends itself to many variations in design features, but the shape of the supporting assembly is important in that it is designed at an optimum angle to encourage the rainwater that hits the extremities of the sheet 10 to splash inwards rather than outwards. This is achieved by having a curvature defined by the difference in height between the top edges of the sheet and the lowest point of the sheet being 400 mm when the length of the curved support member is 2,000 mm. This shape is also the optimum curvature to maintain the shape of the membrane or sheet 10 in extreme weather conditions. The shape provides an aerofoil situation in which abeam wind would actually suck the membrane down in desirable manner.

There are provided steel membrane support rods 73 connecting the housing mouth and the stanchion, being easily pulled out for simple maintenance. The drive motor may be electric, hydraulic, compressed air, water pressure or combustion engine via a system of belts, pulleys, chains and sprockets, gear box and shafts, or manual crank principle. Extended axles may be used for the coupling of further collector housings of substantially identical design, having their axles aligned and using a universal-type coupling for connection purposes for utilisation of a single common drive means, as apparent from FIG. 5.

The membrane supporting means 19 may be as aforedescribed but preferably allows sliding along its entire length on five longitudinal continuous lengths of food-grade pipe (preferably polyethylene) sleeved over an entire length of cable which is strained sufficiently to present a friction-reduced skid plane for the membrane. The extension and retraction of the membrane may be both mechanically or electronically operated. The electronic method is by means of a rain sensor integrated with a reverse polarity circuitry incorporating a timing device utilised for the purpose of allowing sufficient rainfall to clear the atmosphere before commencing collection. Once the rain ceases the system reverses the process and retracts the membrane automatically. The process may also be activated by means of a remote control radio frequency or by a manual power switch. The manual method by means of a hand crank will also be supplied as a contingency in the event of power supply failure.

The length and width of the membrane will be chosen to meet perceived requirements. The housing may be fabricated of any food-grade material, such as stainless, steel, according to the weight of the housing, membrane and support frame, the latter also being of any suitable selected material. The cables are fixed at both ends, one end being fixed to the subframe of the membrane coil housing by means of an eye and man shackle, while the other end is fixed to a post (concreted into the ground) by means of an eye, "D" shackle and turnbuckle, this arrangement providing a means of re-tensioning the cable if and when necessary.

As apparent from the aforegoing, the membrane is extended by means of a cable attached to the outside end. As the membrane is withdrawn from the roll (located inside the housing) it extends along the elevated framework within the guides situated on the top outer edges of the framework. As the membrane extends along this structure it forms a concave shape which allows the rainwater to flow down its length and into the housing via the outlet of the membrane.

The framework in this instance comprises posts of 46 mm galvanised pipe of a length of 2.2 meters. Elevation above the ground (in this model) is 1.8 meters. The post is 400 mm into the ground in a vertical position. The membrane guide, support cross bar, is affixed to the tops of the upright posts at the ends by means of a scaffold fitting. The cross bar is a length of 2.2 meters and is rolled in the centre to present a light curve between 25–30 degrees to allow for the concave formation of the membrane whilst extending.

The framework comprising the uprights posts and crossbar are aligned in pairs and at approximately three meter intervals longitudinally up sloping ground of preferably not less than 5 degrees. This degree of angle might also be achieved by progressively lengthening or lowering the height of the upright posts above ground, along the length of the membrane support structure. This will be the adopted method of installing the system on a level surface or level ground. The plane of the cross bars supporting the membrane must always be in constant alignment (not undulating) to accommodate the configuration of the membrane.

While the apparatus and method as described with reference to the drawings will be found very effective in achieving the objects for which the invention has been devised, it will be understood that the embodiments are illustrative only and may be subject to many further modifications of constructional detail and design, as will be readily apparent to persons skilled in the art. The invention is to be understood to embrace all variations within its broad scope and ambit, as defined by the appended claims.

What is claimed is:

1. A method of collecting rainwater including:
   providing a flexible water-support sheet mounted movably for extension withdrawably from or retraction within a protective housing therefor;
   extending said sheet away from the housing in the event of rain and supporting it in an extended operative attitude so that it is dished transversely thereof and is inclined longitudinally sufficient to cause rainwater which has impinged against it and collected thereon to drain gravitationally back towards the housing;
   drawing off from the sheet at or near the housing the so-collected rainwater for storage or distribution, and
   retracting said sheet to non-operative attitude within the housing for its protection against settlement thereon of dust or other deleterious matter until its use for water collection is again required.

2. A method of collecting rainwater according to claim 1, wherein the water-support sheet is wound about a spool in the form of a coil when retracted, the spool being rotatable about a horizontal axis within the housing, the inner end of the sheet being secured relative to the spool, the latter being permitted rotation so that the free end of the sheet may be withdrawn to operative disposition.

3. A method of collecting rainwater according to claim 1, wherein a plurality of sheet-support assemblies are placed at spaced intervals along the direction of withdrawal, and the free end of the sheet is drawn out by a cable attached at one of its ends to the free end of the sheet and extending around terminal pulley means at the furthermost sheet-support assembly and then back to cable-winding means at or adjacent the housing, and adapted to be actuated to withdraw the sheet until its free end reaches or approaches the terminal pulley means.

4. A method of collecting rainwater according to claim 3, wherein the spool is permitted rotation in both directions of rotation and has means whereby rotation is effected to retract the sheet from its extended disposition when so required.

5. A method of collecting rainwater according to claim 4, wherein power-actuation means are provided and utilized for actuation of the cable-winding means when the sheet is to be extended or for drivably rotating the spool when retraction of the sheet is required.

6. A method of collecting rainwater according to claim 1, wherein the collection of rain water is effected simultaneously at a plurality of housings each having a water-support sheet, the collected water being conveyed by delivery tube means connecting all housings to one or more holding tanks for subsequent distribution.

7. Apparatus for collecting rainwater including:
   a flexible water-support sheet of elongate rectangular form mounted in a housing in such manner that it is movable between a stored non-operative disposition within the housing and shielded thereby from unwanted matter and an extended operative disposition in which a free end of the sheet extends through an opening in the housing and substantially longitudinally to a predetermined extent;
   sheet-support means arranged to support the extended sheet in said operative disposition in such manner that the sheet is dished transversely to trough-like form to receive and retain rainwater and is inclined upwardly in its longitudinal direction away from the housing for draining received water gravitationally back to the housing, and
   water control means associated with the housing whereby water received from the extended operative water-support sheet is available for passage to storage or distribution means.

8. Apparatus for collecting rainwater according to claim 7, including a spool about which the water-support sheet is wound in the form of a coil when retracted, the spool being rotatable about a horizontal axis within the housing, the inner end of the sheet being secured relative to the spool, and wherein the spool is permitted rotation so that the free end of the sheet may be withdrawn to operative disposition.

9. Apparatus for collecting rainwater according to claim 7, wherein the means for supporting the extended sheet include a plurality of sheet-support assemblies adapted to be mounted at spaced intervals along the direction of withdrawal and a cable having one end attached to the free end of the sheet and extending around terminal pulley means at the furthermost sheet support assembly and returned to cable-winding means at or adjacent the housing.

10. Apparatus for collecting rainwater according to claim 9 wherein each supporting assembly includes a pair of fixed support posts fixedly mounted at their lower ends and inter-connected at their upper ends by a downwardly-bowed support member adapted to provide support for the sheet beneath and transversely across the sheet.

11. Apparatus for collecting rainwater according to claim 9, wherein the sheet is held on the support member in transversely-dished manner by the provision of retaining and guiding clips or lugs so placed at the upper ends of the support posts as to be disposed above the sheet edges and thus retain the edges against vertical dislodgement while permitting sliding of the sheet for extension and retraction purposes.

12. Apparatus for collecting rainwater according to claim 8, wherein the spool is permitted rotation in both directions of rotation and has means whereby rotation is effected to retract the sheet from its extended disposition when so required.

13. Apparatus for collecting rainwater according to claim 12, wherein power-actuation means are provided and adapted to be utilized for actuation of the cable-winding means when the sheet is to be extended or for drivably rotating the spool when retraction of the sheet is required.

14. Apparatus for collecting rainwater according to claim 7, and including a plurality of housings arranged in a group and each having a water-support sheet, means being provided whereby the collected water may be conveyed by delivery tube means connecting all housings to one or more holding tanks for subsequent distribution.

* * * * *

UNITED STATES PATENT AND TRADEMARK OFFICE
CERTIFICATE OF CORRECTION

PATENT NO. : 6,851,441 B2
DATED : February 8, 2005
INVENTOR(S) : Wilson

It is certified that error appears in the above-identified patent and that said Letters Patent is hereby corrected as shown below:

Column 2
Line 27, delete "X"
Line 65, delete "Fig. 6" and replace with -- Fig. 5 --
Line 67, delete "sheet, and" and replace with -- sheet; --

Column 3,
Line 1, insert -- Fig. 6 shows in detail the drive and clutch components shown in Fig. 5, and --

Column 4,
Line 5, delete "connect d" and replace with -- connected --

Column 5,
Line 26, delete "man" and replace with -- D --

Signed and Sealed this

Seventh Day of June, 2005

JON W. DUDAS
*Director of the United States Patent and Trademark Office*